United States Patent Office 3,589,863
Patented June 29, 1971

3,589,863
METHOD OF REMOVING SULFUR DIOXIDE AND PARTICULATE MATTER FROM GASEOUS STREAMS
Ludo K. Frevel, Midland, and Leonard J. Kressley, Saginaw, Mich., assignors to The Dow Chemical Company, Midland, Mich.
No Drawing. Filed Mar. 8, 1968, Ser. No. 711,480
The portion of the term of the patent subsequent to Apr. 7, 1987, has been disclaimed
Int. Cl. B01d 53/34, 53/04
U.S. Cl. 23—25                     11 Claims

ABSTRACT OF THE DISCLOSURE

Acid gases and particulate matter are removed from gaseous streams by a process which comprises passing the gaseous stream through a bed of porous alkali metal bicarbonate aggregates. The bed can be a fixed system or a countercurrently moving, replenished system. The porous aggregates attract the particulate matter to their surfaces and thus remove them from the stream while the acid gas is simultaneously reacted within or around the aggregates to form solids which leave the gaseous stream.

BACKGROUND OF THE INVENTION

It has been estimated that 12 million tons of particulate matter are poured into the atmosphere of the United States each year. Similarly acid gases add many more tons of contamination (e.g. an estimated total of 25 million tons of sulfur dioxide per year). The public has become increasingly concerned over the problems of air pollution in recent years and much legislation on both the state and federal levels has been the result.

The problems of removing acid gas and particulate matter from gaseous streams (e.g. stack or flue gases from burning combustible products) are varied and many attempts have been made to realize a simple and economical method for their removal. In general, these methods have entailed the use of multi-step processes which are cumbersome and expensive. Moreover, they are usually directed to either acid gas or particulate matter removal and no efficient method of simultaneous removal has been found.

Typical of the processes now proposed or in operation include absorption processes for $SO_2$ removal (e.g. manganese dioxide particles absorb $SO_2$ and then are collected in electrostatic precipitators); reaction processes for $SO_2$ removal (e.g. reacting $SO_2$ with molten carbonates to produce sulfates and sulfites which are subsequently reduced to hydrogen sulfide); oxidation of $SO_2$ (e.g. $SO_2$ is oxidized to $SO_3$ in the presence of a vanadium pentoxide catalyst and hydrated to sulfuric acid); and scrubbing processes for $SO_2$ removal (e.g. injecting crushed dolomite into the system to form solid sulfur compounds which are then scrubbed for removal). It is known that $SO_2$ will react to some extent with sodium bicarbonate. Izv. Vusshikh Uchebn. Zavedenii, Khim. i Khim. Tekhnol. 5(5), 770–4 (1962). Although some of these processes, in conjunction with other processes or individually, remove some particulate matter, highly efficient removal is not obtained.

SUMMARY OF THE INVENTION

It has now been found that acid gas and/or particulate matter are removed from a gaseous stream by a process which comprises contacting the gaseous stream with porous alkali metal bicarbonate aggregates. By conducting the removal process in this manner, highly efficient removal of acid gas and particulate matter is achieved and useful byproducts are obtained.

In order to practice the invention, the gaseous stream is contacted with the bicarbonate in any convenient manner. It is preferred to contact the gaseous stream with the bicarbonate by passing said stream through a bicarbonate bed.

The stream containing acid gases and particulate matter can contain such substances as nitrogen, oxygen, argon, neon, krypton, xenon, helium, carbon monoxide, water vapor, hydrogen bromide, hydrogen chloride, carbon dioxide, sulfur dioxide, sulfuric acid, sulfur trioxide, nitric oxide, nitrogen dioxide, hydrocarbon gases, aldehydes, soot, fly ash and the like. By practice of this invention, the acid gases (i.e. those which are more acidic than carbonic acid, e.g. hydrogen bromide, hydrogen chloride, hydrogen sulfide, sulfur dioxide and sulfur trioxide) can be effectively removed from gaseous streams to such an extent that their final concentration is often less than 10 to 20 parts per million. Similarly, more than 90% of any particulate matter present in the gaseous stream is usually removed. Thus, the common flue or stack gases which are associated with the burning of combustible materials (e.g. coal, fuel oil or natural gas) no longer need contribute to the tons of sulfur and particulate material which are poured into the atmosphere each day.

A preferred embodiment of this invention is the removal of acid gases and/or particulate matter from gaseous streams in which they are present in small amounts (i.e. less than about 10% of the gaseous stream by volume). Sulfur dioxide and/or fly ash removal is also a preferred embodiment of this invention.

The space velocity of the gaseous stream is not critical to this invention and can be varied widely. For example, space velocities of between 2000 and 20,000 reciprocal hours or even more can suitably be employed. Space velocity ($Vs$) is defined as $$Vs = \frac{\text{Volume of gaseous stream per hour (calculated at } 0°\text{ C. and 760 mm. Hg)}}{\text{Bulk volume of the bicarbonate bed}}$$

The bed through which the gaseous stream is preferably passed contains porous alkali metal bicarbonate aggregates. The bed can be a stationary bed or a moving bed of the type wherein the reacted portion of the bed is discharged from the bed, thus causing the remainder of the bed to move countercurrently to the direction of flow of the gaseous stream while fresh alkali metal bicarbonate is being added to the remainder of the bed to restore the bed to its original volume (i.e. in an amount equal to the disposed reacted bicarbonate). The movement and replenishment of the bed can be continuous or intermittent. The depth of the bed is not critical to this invention and can be varied widely, e.g. bed depths at between 6 inches and 20 feet or higher can suitably be employed.

The porous alkali metal bicarbonate used is preferably sodium bicarbonate, although lithium, potassium, rubidium and cesium bicarbonate can be employed in this invention. Combinations of alkali metal bicarbonate can also be used, e.g. 90% sodium and 10% potassium bicarbonate is an effective bed.

The use of the term "porous" is meant to denote open-cell bicarbonate which is permeable to gas flow. The porosity (i.e. the volume of void within the aggregate divided by the apparent volume of the aggregate) of the bicarbonate aggregates is preferably between 10 and 60 percent. The acid gas removed by this invention reacts both inside and around the outer surface of the aggregate to form solids which remain in the bed. For example, by the practice of this invention, sulfur dioxide forms principally sulfites in gaseous streams containing no nitric oxide and principally sulfates in nitric oxide-containing streams. An important advantage in using these porous aggregates is the low pressure drop obtained.

The particulate matter within the gaseous stream is attracted to and held on the surface of the bicarbonate aggregates by a phenomenon not understood and thus is effectively removed. For example, fly ash readily adheres to the surface of sodium bicarbonate aggregates. The Brunauer-Emmett-Teller (BET) surface area of the aggregates is preferably between 0.3 and 5 square meters per gram. The aggregates can be made by various methods and can be made into a variety of shapes including irregular or regular spherical, cylindrical or tablet-shaped bodies. One method is to pulverize ordinary crystalline bicarbonate to submicron size in a ball mill. The resulting ultra-fine powder is then formed into the desired shape. In general, the preferred dimension along the longest axis of the aggregate is between $1/16''$ and $3/4''$.

The operable temperature range of this process is very broad and can suitably vary from between 0° C. and 160° C. Preferably the range is between the dew point of the gaseous stream, typically around 50° C., and 130° C. Pressure is not critical to this invention and although around atmospheric pressure is preferred, sub-atmospheric and superatmospheric pressures can be used.

In operation, the particular matter adheres to the surface of the porous bicarbonate aggregates and acid gas is removed by reaction to form solids. The particulate matter and acid gas reaction products are more concentrated, after a few minutes of running time, at the gaseous stream entering portion of the bed and are progressively less concentrated towards the gaseous stream exit portion of the bed. Thus, in a stationary bed for removing particulate matter or acid gas and particulate matter, not regenerated at some point in time, the pressure drop across the bed will tend to increase and the acid gas concentration in the exit portion of the bed will rise with time. A preferred bed is the moving type of bed wherein the gaseous stream entering portion of the bed which has been reacted is discharged from the bed, and the remainder of the bed is shifted countercurrently to the direction of gaseous flow while fresh bicarbonate is added to the shifted bed in an amount equal to the disposed reacted bicarbonate. This moving type of bed allows a continuous process for acid gas and/or particulate matter to take place in a single vessel.

DESCRIPTION OF SPECIFIC EMBODIMENTS

Below are specific examples of the practice of this invention. Example 1 demonstrates the removal of an acid gas and Example 2 demonstrates both acid gas and particulate matter removal. In each example, the BET surface area of the aggregates was 1.23 m.$^2$/g. and the porosity was 55%.

Example 1

A straight steam-jacketed glass tube was loaded with 10 g. of porous $NaHCO_3$ aggregates (14–20 mesh). The dimensions of the bed were: I.D.=0.95 cm., length=27.5 cm. Synthetic stack gas containing 0.20 volume percent $SO_2$, 3.0 volume percent $H_2O$, 15.5 volume percent $CO_2$ and 79.3 volume percent $N_2$, was passed through a short preheat-section and then through the 100° C. steam-heated bed at a rate of 675 ml./min. (23° C., 1 atm.). The effluent was passed through an ice trap (0° C.) to remove the bulk of the water vapor, through a small $CaSO_4$ tube and then through an I.R. cell for continuous monitoring of $SO_2$.

The run was conducted for 12 hours. at the termination of which $SO_2$ was detected in the monitoring cell. Prior to that time, no $SO_2$ was found in the effluent. The temperature of the bed was essentially 100° C. throughout the entire run.

The bed was broken down and the inlet end of the bed was chemically analyzed; the remaining four sections were analyzed by X-ray diffraction (accurate to ±10%). The results are reported below. The composition of each section is reported in weight percent. The pressure drop across the bed decreased from 190 cm. $H_2O$ at the start of the run to 173 cm. $H_2O$ at the finish.

TABLE I

| Bed section | Length (cm.) | $NaHCO_3$ | $Na_2SO_3$ | $Na_2CO_3$ | NaCl |
|---|---|---|---|---|---|
| Inlet end | 3 | 1.19 | 97.2 | | |
| Next section | 8 | | 95 | | 5 |
| Do | 11 | 5 | 90 | | 5 |
| Do | 4 | 10 | 80 | 5 | 5 |
| Exit end | 1 | 10 | 75 | 10 | 5 |

Example 2

A 4 inch I.D. glass pipe spool piece 12 inches in length was fitted with end caps containing multiple inlet and outlet connections and mounted in a vertical position. The top cap was gasketed in conventional manner, but the bottom cap gasket was made from 1/8 inch plastic coated sheet cut to fit the pipe end and having the entire portion perforated with 1/2 inch holes. This also served as support for a circular piece of (1/4" x 1/4") #14-wire screen (with 0.2" x 0.2" openings) on which aggregates of porous $NaHCO_3$ were placed to a depth of about 19 cm. Aggregates of the size which passed through a 1/4" x 1/4" opening and yet were retained on a #4 U.S. standard sieve were used. A smaller particle size $NaHCO_3$ aggregate, down to 6-mesh, was used to fill the remainder of the vessel to a total bed depth of approximately 29 cm. A circular piece of 20-mesh stainless steel screen was then laid on top and three thicknesses of the coarse glass fiber filler from 1½ inch commercial air duct filters, was placed over this and into the top cap.

The lower inlet connection was joined to an adapter fitted to a piece of 3-inch pipe inserted about 3 feet into a stack gas stream containing approximately, by volume, 72.6 percent nitrogen, 14.6% carbon dioxide, 8.8% water vapor, 2.8% oxygen, 0.9% argon, 0.1% nitric oxide and 0.17% sulfur dioxide and ~102 mg./m.$^3$ of fly ash. The upper outlet was connected by 1 inch I.D. rubber tubing to the inlet of a small blower. Dial thermometers were placed in ports in both end caps along with connections for measuring pressure differential and for gas sampling. A calibrated orifice was placed in the line between the top outlet and the blower, and was used to roughly determine the gas flow during the experiment. The flow rate was controlled by varying the power to the blower motor. The pressure differentials across the orifice and through the bed were measured in mm. $H_2O$ with manometers. A small sample stream from the top cap connection was passed through a trap in ice-water, then through a small glass tube containing ~2 g. 100–200 mesh $NaHCO_3$, measured with a rotameter type flowmeter, and finally exhausted into a vacuum line. Another sample stream was passed through a small trap at ambient temperature and then over a colored indicator which changes color in the presence of 20 p.p.m. $SO_2$.

Before starting the run, the unit and its contents were heated by running the blower at a fairly high rate to draw air (heated by an auxiliary heater) through the bottom inlet until the upper thermometer registered about 70° C. It was then connected to the flue and the run started. After 15 minutes, flows were started through the analytical units. The lineal flow rate through the main unit was maintained between 110 and 120 ft./min. The pressure drop across the bed gradually increased from 18 mm. $H_2O$ to ~58 mm. $H_2O$. The flow through the analytical $NaHCO_3$ bed was maintained at ~160 ml./min. Dust and any traces of $SO_2$ passing through the main bed were collected in this unit. Dust was noticed to be collecting on this bed within 25 minutes after having been put on stream. The $SO_2$ indicator tube contained a reagent which turns green within 30 minutes when a stream containing 20 p.p.m. $SO_2$ passes over it at ~150 ml./min. During the first 4.25 hours of the run no change was noticed, then the color change was sharp and intense indicating a sudden breakthrough of $SO_2$ at a relatively high concentration. The run was terminated at the end of 4.5 hours, the unit disconnected and air drawn through it for a few minutes to purge it, then allowed to cool for about an hour.

The unit was opened and the aggregate removed in 5 separate layers at 1 inch down, 3 inches down, 6.25 inches down, 9 inches down and the remaining bottom portion. The amount of ash could be seen to increase progressively toward the bottom. The bottom layer of dust-covered aggregate (179.5 g.) was placed on a No. 30 U.S. Standard sieve and shaken, yielding 6 g. of ash and fines. Two successive sievings on a No. 14 sieve resulted in 2.5 g. and 4.5 g. of additional dust. Ninety percent of the particulate matter in the stack gas was removed. The composition of the bed, in weight percent, is reported below. The temperature range at the inlet portion of the bed, from start up to finish, respectively, was from 104 to 122° C.

The inlet to the bed was chemically analyzed, and the remaining sections were analyzed by X-ray diffraction (accurate to ±10%).

TABLE II

| Bed section | Length (inches) | $Na_2SO_4$ | $Na_2CO_3$ | NaC |
|---|---|---|---|---|
| Inlet end | ~2⅜ | 79.3 | 14.52 | 3.43 |
| Next section | ~2¾ | 90 | 8 | 2 |
| Do | ~3¼ | 83 | 15 | 2 |
| Do | ~2 | 30 | 65 | 5 |
| Exit end | ~1 | 25 | 70 | 5 |

We claim:

1. A method for removing $SO_2$ and particulate matter from a gaseous stream, which comprises contacting the gaseous stream with porous alkali metal bicarbonate aggregates.

2. A method as defined in claim 1 wherein the gaseous stream is passed through a bed of porous alkali metal bicarbonate aggregates.

3. A method as defined in claim 2 wherein the temperature of the gas stream is between its dew point and 130° C.

4. A method as defined in claim 3 wherein the reacted portion of the bed is discharged from the bed, the bed is moved countercurrently to the direction of gaseous stream flow and fresh porous alkali metal bicarbonate is added to restore the bed to the original volume.

5. A method as defined in claim 4 wherein the movement of the bed is continuous.

6. A method as defined in claim 4 wherein the movement of the bed is intermittent.

7. A method as defined in claim 2 wherein the porosity of the aggregates is between 10 and 60%.

8. A method as defined in claim 7 wherein the BET surface area of the aggregates is between 0.3 and 5 square meters per gram.

9. A method as defined in claim 8 wherein the dimension of the aggregates along their longest axis is between $\frac{1}{16}''$ and $\frac{3}{4}''$.

10. A method as defined in claim 9 wherein the space velocity of the gaseous stream is between 2000 and 20,000 reciprocal hours.

11. A method as defined in claim 10 wherein the alkali metal is sodium.

References Cited

FOREIGN PATENTS

| 18,775 | 12/1888 | Great Britain | 23—130 |
| 10,556 | 8/1916 | Great Britain | 23—130 |

EARL C. THOMAS, Primary Examiner

U.S. Cl. X.R.

23—121, 129, 178; 55—73, 74, 98